United States Patent
Ninomiya et al.

(10) Patent No.: US 12,427,955 B2
(45) Date of Patent: Sep. 30, 2025

(54) MOTION MANAGER AND INFORMATION PROCESSING METHOD

(71) Applicants: TOYOTA JIDOSHA KABUSHIKI KAISHA, Toyota (JP); J-QuAD DYNAMICS Inc., Tokyo (JP); ADVICS CO., LTD., Kariya (JP)

(72) Inventors: Kazuki Ninomiya, Toyota (JP); Masanobu Horio, Tokyo (JP); Atsushi Kuchinomachi, Tokyo (JP)

(73) Assignees: TOYOTA JIDOSHA KABUSHIKI KAISHA, Toyota (JP); J-QUAD DYNAMICS INC., Tokyo (JP); ADVICS CO., LTD., Kariya (JP)

( * ) Notice: Subject to any disclaimer, the term of this patent is extended or adjusted under 35 U.S.C. 154(b) by 50 days.

(21) Appl. No.: 18/598,044

(22) Filed: Mar. 7, 2024

(65) Prior Publication Data

US 2024/0317194 A1    Sep. 26, 2024

(30) Foreign Application Priority Data

Mar. 23, 2023 (JP) ................. 2023-046223

(51) Int. Cl.
- *B60W 10/18* (2012.01)
- *B60T 8/171* (2006.01)
- *B60W 50/10* (2012.01)

(52) U.S. Cl.
CPC ............. *B60T 8/171* (2013.01); *B60W 10/18* (2013.01); *B60W 50/10* (2013.01); *B60T 2210/20* (2013.01); *B60T 2220/00* (2013.01)

(58) Field of Classification Search
CPC .. B60T 8/171; B60T 2210/20; B60T 2220/04; B60W 10/18; B60W 50/10
USPC ........................................................... 701/70
See application file for complete search history.

(56) References Cited

U.S. PATENT DOCUMENTS

| | | | |
|---|---|---|---|
| 2019/0168724 A1* | 6/2019 | VandenBerg, III | ..... B60T 8/171 |
| 2022/0266819 A1 | 8/2022 | Itoh et al. | |
| 2023/0174034 A1* | 6/2023 | Kim | ....... B60T 13/686 |
| | | | 701/70 |
| 2023/0234584 A1* | 7/2023 | Ayabe | .... B60W 30/02 |
| 2023/0382358 A1* | 11/2023 | Miyake | ..... B60T 13/74 |
| 2024/0034284 A1* | 2/2024 | Hurley | ........ B60T 17/221 |
| 2024/0174208 A1* | 5/2024 | Beaulieu | ...... B60T 13/683 |

FOREIGN PATENT DOCUMENTS

JP    2022-127419 A    8/2022

* cited by examiner

*Primary Examiner* — Erick R Solis
(74) *Attorney, Agent, or Firm* — Oliff PLC

(57) ABSTRACT

A motion manager includes one or more processors configured to: receive a stop holding request for keeping a vehicle in a stopped state as one of motion requests from application software; and output an instruction value for turning ON a hydraulic brake to the hydraulic brake on a condition that the stop holding request is received. The one or more processors are configured to continue outputting the instruction value to a parking brake regardless of a presence or absence of the stop holding request, when outputting an instruction value for turning ON a parking brake to the parking brake after starting outputting the instruction value and until switching of the parking brake to an ON state is completed.

6 Claims, 3 Drawing Sheets

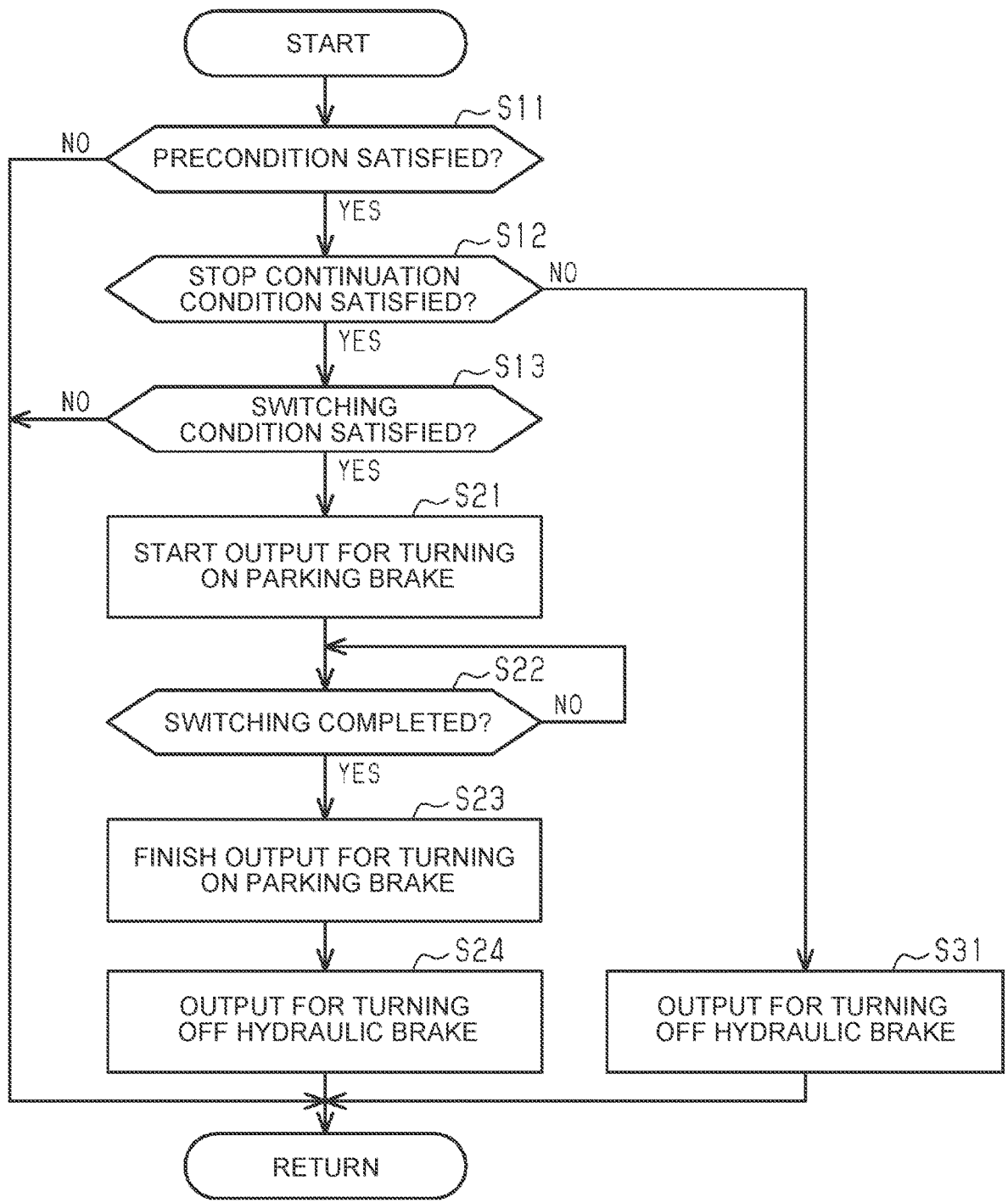

MOTION MANAGER AND INFORMATION PROCESSING METHOD

CROSS-REFERENCE TO RELATED APPLICATION

This application claims priority to Japanese Patent Application No. 2023-046223 filed on Mar. 23, 2023 incorporated herein by reference in its entirety.

BACKGROUND

1. Technical Field

The present disclosure relates to a motion manager and an information processing method.

2. Description of Related Art

A vehicle according to Japanese Unexamined Patent Application Publication No. 2022-127419 (JP 2022-127419 A) includes a motion manager, a hydraulic brake, and an electric parking brake. The motion manager receives a stop holding request for keeping the vehicle in a stopped state as one of motion requests from application software. The motion manager also controls the hydraulic brake and the electric parking brake based on the stop holding request.

SUMMARY

Generally, a motion manager such as that disclosed in JP 2022-127419 A outputs an instruction value for turning ON a hydraulic brake to the hydraulic brake on a condition that a stop holding request is received. Here, for some reason, for example, when a driver tries to get off a vehicle, it is preferable to switch the device for keeping a stopped state from the hydraulic brake to an electric parking brake partway through. In this case, the stop holding request may be interrupted before the switching from the hydraulic brake to the electric parking brake has been completed. When the stop holding request is interrupted, it is difficult to realize keeping the vehicle in the stopped state with the electric parking brake since keeping the stopped state with the electric parking brake is treated as unnecessary.

A first aspect of the present disclosure is a motion manager that includes one or more processors. The one or more processors are configured to receive a stop holding request for keeping a vehicle in a stopped state as one of motion requests from application software and are configured to output an instruction value for turning ON a hydraulic brake to the hydraulic brake on a condition that the stop holding request is received. When outputting an instruction value for turning ON a parking brake to the parking brake, the one or more processors are configured to continue outputting the instruction value to the parking brake regardless of a presence or absence of the stop holding request, after starting outputting the instruction value and until the switching of the parking brake to the ON state is completed.

In the first aspect, the one or more processors may be configured to output the instruction value for turning ON the parking brake to the parking brake on a condition that the stop holding request is received and that a predetermined stop continuation condition serving as a condition for allowing continuation of the stopped state is satisfied. The one or more processors may be configured to output an instruction value for turning OFF the hydraulic brake to the hydraulic brake without outputting the instruction value for turning ON the parking brake to the parking brake on the condition that the stop holding request is received and that the stop continuation condition is not satisfied.

In the first aspect, the stop continuation condition may include that a slope of a road surface on which the vehicle is located is less than a predetermined prescript slope.

In the first aspect, the one or more processors may be configured to output the instruction value for turning ON the parking brake to the parking brake on a condition that the stop holding request is received and that a predetermined switching condition is satisfied as a condition that the switching of the parking brake to the ON state is allowed. The one or more processors may be configured to continue outputting an instruction value for turning ON the hydraulic brake to the hydraulic brake without outputting the instruction value for turning ON the parking brake to the parking brake on the condition that the stop holding request is received and that the switching condition is not satisfied.

In the first aspect, the switching condition may include that a driver of the vehicle tries to get off the vehicle.

A second aspect of the present disclosure is an information processing method. The information processing method includes receiving, by an information processing device, a stop holding request for keeping a vehicle in a stopped state as one of motion requests from application software, outputting, by the information processing device, an instruction value for turning ON a hydraulic brake to the hydraulic brake on a condition that the stop holding request is received, and continuing, by the information processing device, when outputting an instruction value for turning ON a parking brake to the parking brake, outputting the instruction value to the parking brake regardless of a presence or absence of the stop holding request, after starting outputting the instruction value and until the switching of the parking brake to the ON state is completed.

According to the first aspect and the second aspect, even when the stop holding request is no longer present before the switching of the parking brake to the ON state has been completed, the vehicle can be kept in a stopped state by turning ON the parking brake.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a flowchart showing brake switching control.

DETAILED DESCRIPTION OF EMBODIMENTS

Schematic Configuration of Vehicle

An embodiment of the present disclosure will be described below with reference to FIGS. 1 to 3. First, a schematic configuration of a vehicle 100 will be described.

Figure 1:
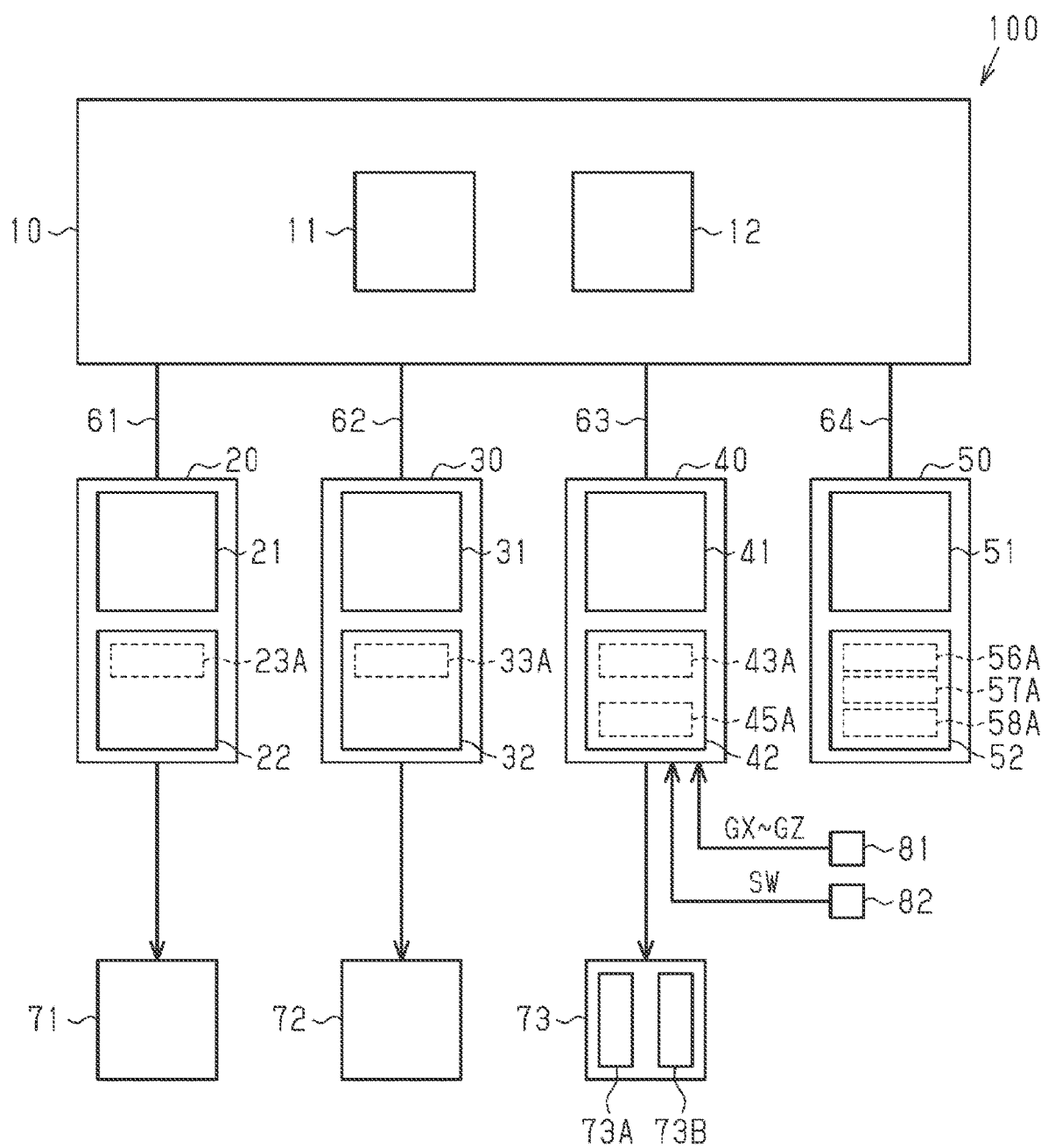
FIG. 1 is a schematic configuration diagram of a vehicle.

As shown in FIG. 1, the vehicle 100 includes a powertrain device 71, a steering device 72, and a braking system 73. The powertrain device 71 includes an engine, a transmission, and the like. The engine can provide driving force to a driving wheel of the vehicle 100 via the transmission. An example of the steering device 72 is a rack and pinion electric steering device. The steering device 72 can change a direction of a steering wheel of the vehicle 100 by controlling a rack and pinion (not shown).

The braking system 73 generates a braking force of the vehicle 100. The braking system 73 includes a hydraulic brake 73A and a parking brake 73B. Here, the hydraulic brake 73A is a device that controls the braking force of the vehicle 100 by adjusting hydraulic pressure. An example of the hydraulic brake 73A is a disc brake. Furthermore, the parking brake 73B is a device, or a so-called electric parking brake, that keeps the vehicle 100 in the stopped state by pressing a pad against a disc rotor by operating an electric motor.

As shown in FIG. 1, the vehicle 100 includes a central ECU 10, a powertrain ECU 20, a steering ECU 30, a brake ECU 40, and an advanced driving assistance ECU 50. The vehicle 100 also includes a first external bus 61, a second external bus 62, a third external bus 63, and a fourth external bus 64. Note that ECU is an abbreviation for an electronic control unit.

The central ECU 10 performs overall control of the entire vehicle 100. The central ECU 10 includes a central processing unit (CPU) 11 and a storage device 12. The storage device 12 stores various programs and various data in advance. Note that the storage device 12 includes read only memory (ROM), random access memory (RAM), and storage. The CPU 11 realizes various processes by executing the programs stored in the storage device 12.

The powertrain ECU 20 can communicate with the central ECU 10 via the first external bus 61. The powertrain ECU 20 controls the powertrain device 71 by outputting a control signal to the powertrain device 71. The powertrain ECU 20 includes a CPU 21 and a storage device 22. The storage device 22 stores various programs and various data in advance. Furthermore, the storage device 22 stores in advance a powertrain application 23A as one of the various programs. The powertrain application 23A is application software that controls the powertrain device 71. Note that the storage device 22 includes ROM, RAM, and storage. The CPU 21 executes the powertrain application 23A that is stored in the storage device 22, thereby realizing a function as a powertrain control unit 23, which will be described later.

The steering ECU 30 can communicate with the central ECU 10 via the second external bus 62. The steering ECU 30 controls the steering device 72 by outputting a control signal to the steering device 72. The steering ECU 30 includes a CPU 31 and a storage device 32. The storage device 32 stores various programs and various data in advance. Furthermore, the storage device 32 stores in advance a steering application 33A as one of the various programs. The steering application 33A is application software that controls the steering device 72. Note that the storage device 32 includes ROM, RAM, and storage. The CPU 31 executes the steering application 33A that is stored in the storage device 32, thereby realizing a function as a steering control unit 33, which will be described later.

The brake ECU 40 can communicate with the central ECU 10 via the third external bus 63. The brake ECU 40 controls the braking system 73 by outputting a control signal to the braking system 73. The brake ECU 40 includes a CPU 41 and a storage device 42. The storage device 42 stores various programs and various data in advance. Furthermore, the storage device 42 stores in advance a brake application 43A as one of the various programs. The brake application 43A is application software that controls the braking system 73. Furthermore, the storage device 42 stores in advance a motion manager application 45A as one of the various programs. The motion manager application 45A is application software that arbitrates a plurality of motion requests. Note that the storage device 42 includes ROM, RAM, and storage. The CPU 41 executes the brake application 43A that is stored in the storage device 42, thereby realizing a function as a brake control unit 43, which will be described later. Furthermore, the CPU 41 executes the motion manager application 45A that is stored in the storage device 42, thereby realizing a function as a motion manager 45, which will be described later. In other words, the CPU 41 executes the motion manager application 45A that is stored in the storage device 42, thereby executing various processes in an information processing method. Note that the brake ECU 40 is an example of an information processing device.

The advanced driving assistance ECU 50 can communicate with the central ECU 10 via the fourth external bus 64. The advanced driving assistance ECU 50 executes various driving assistance. The advanced driving assistance ECU 50 includes a CPU 51 and a storage device 52. The storage device 52 stores various programs and various data in advance. The various programs include a first assistance application 56A, a second assistance application 57A, and a third assistance application 58A. An example of the first assistance application 56A is a collision damage reducing brake that automatically brakes the vehicle 100 to reduce a damage of a collision, that is, so-called autonomous emergency braking (AEB) application software. An example of the second assistance application 57A is a lane keeping assist application that maintains a lane in which the vehicle 100 is traveling, that is, so-called lane keeping assist (LKA) application software. An example of the third assistance application 58A is application software for following driving, or so-called adaptive cruise control (ACC) application software, in which the vehicle 100 follows a preceding vehicle of the vehicle 100 while maintaining an inter-vehicle distance between the vehicle 100 and the preceding vehicle. In the present embodiment, each of the first assistance application 56A, the second assistance application 57A, and the third assistance application 58A is application software that realizes a driving assistance function of the vehicle 100. Note that the storage device 52 includes ROM, RAM, and storage. The CPU 51 executes the first assistance application 56A that is stored in the storage device 52, thereby realizing a function as a first assistance unit 56, which will be described later. Also, the CPU 51 executes the second assistance application 57A that is stored in the storage device 52, thereby realizing a function as a second assistance unit 57, which will be described later. The CPU 51 executes the third assistance application 58A that is stored in the storage device 52, thereby realizing a function as a third assistance unit 58, which will be described later.

As shown in FIG. 1, the vehicle 100 includes an acceleration sensor 81 and a plurality of seat belt switches 82. The acceleration sensor 81 is a so-called three-axis sensor. That is, the acceleration sensor 81 can detect front-rear acceleration GX, lateral acceleration GY, and vertical acceleration GZ. The front-rear acceleration GX is acceleration along a front-rear axis of the vehicle 100. The lateral acceleration GY is acceleration along a lateral axis of the vehicle 100. The vertical acceleration GZ is acceleration along a vertical axis of the vehicle 100. The seat belt switch 82 detects a wearing signal SW indicating a wearing state of the seat belt. In the present embodiment, when the seat belt is worn, the wearing signal SW is an ON signal. Further, when the seat belt is not worn, the wearing signal SW is an OFF signal. In the present embodiment, the vehicle 100 includes the seat belt switches 82 corresponding to a plurality of the seat belts that the vehicle 100 includes. Note that in FIG. 1, only one seat belt switch 82 is shown as a representative.

The brake ECU 40 obtains various signals from the acceleration sensor 81 and the seat belt switches 82. Furthermore, the brake ECU 40 calculates, based on the front-rear acceleration GX, the lateral acceleration GY, and the vertical acceleration GZ at each predetermined control period, a road surface slope AR that is a slope of the road surface on which the vehicle 100 is located.

Basic Configuration Related to Motion Manager

Next, a basic configuration related to the motion manager 45 will be explained with reference to FIG. 2. As shown in FIG. 2, the motion manager 45 can communicate among each other with the first assistance unit 56, the second assistance unit 57, and the third assistance unit 58. The motion manager 45 can also communicate among each other with the powertrain control unit 23, the steering control unit 33, and the brake control unit 43.

The first assistance unit 56, the second assistance unit 57, and the third assistance unit 58 output the motion request to the motion manager 45 when various controls are executed. At this time, the first assistance unit 56, the second assistance unit 57, and the third assistance unit 58 continue outputting the motion request from when various controls become necessary to when the controls are no longer necessary, for example. Here, the motion request includes an acceleration requested value for controlling the acceleration in the front-rear direction of the vehicle 100, a stop holding request RS for holding the vehicle 100 in the stopped state, and the like.

Figure 2:
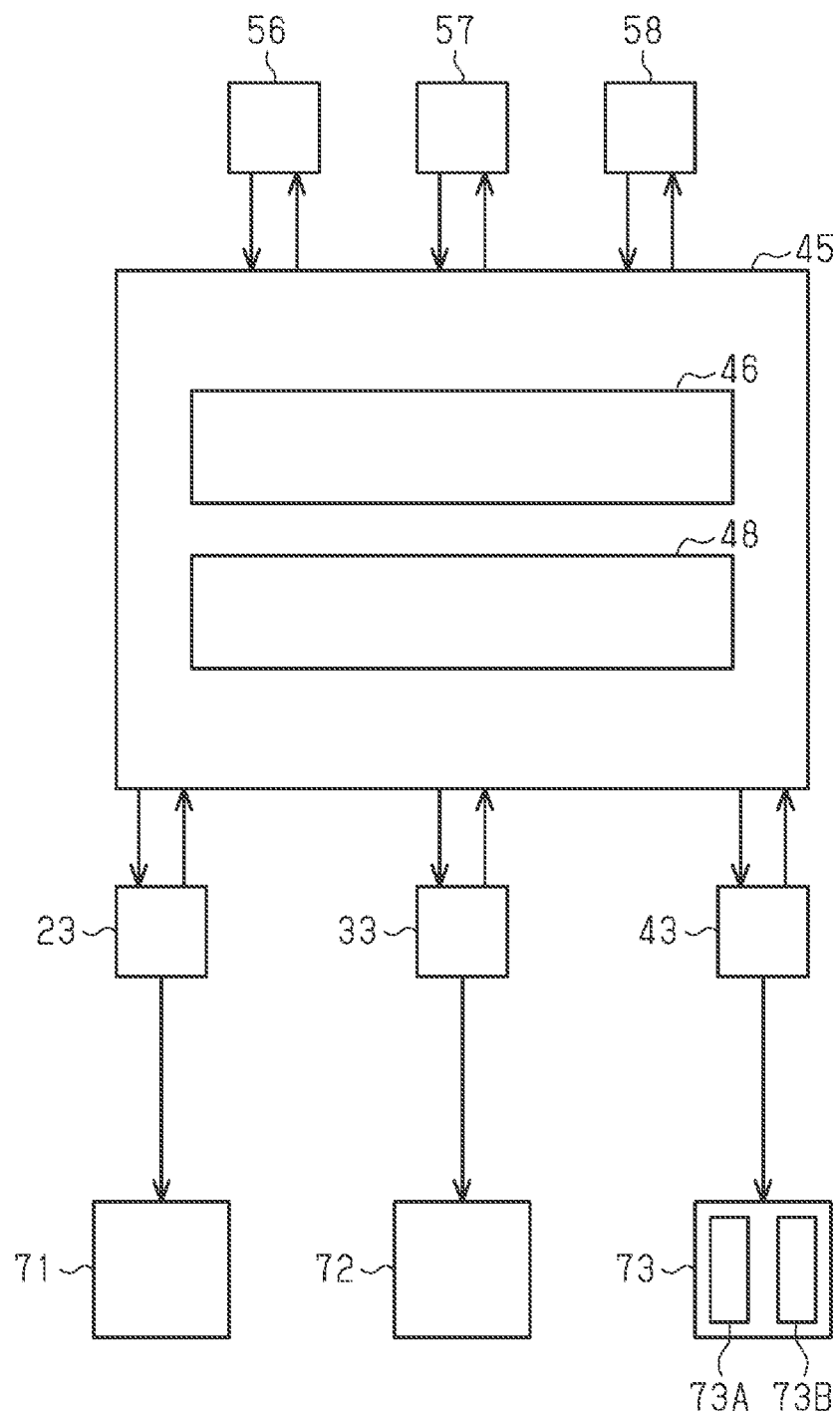
FIG. 2 is a functional block diagram that indicates a basic configuration of a motion manager.

As shown in FIG. 2, the motion manager 45 includes a reception unit 46 and an output unit 48. The reception unit 46 of the motion manager 45 receives the motion request from the first assistance unit 56, the second assistance unit 57, and the third assistance unit 58. In the present embodiment, receiving the motion requests from the first assistance unit 56, the second assistance unit 57, and the third assistance unit 58 corresponds to receiving a motion request from the application software. Further, the output unit 48 of the motion manager 45 arbitrates the motion requests received by the reception unit 46. For example, when the reception unit 46 has received the acceleration requested values from each assistance unit, the output unit 48 selects the smallest acceleration requested value as an arbitration result. Furthermore, when the reception unit 46 receives the stop holding request RS from any of the assistance units, the output unit 48 selects the stop holding request RS as an arbitration result regardless of other motion requests. Then, the output unit 48 of the motion manager 45 outputs, based on the arbitration result, an instruction value of the motion request to control various actuators. Here, the various actuators include the powertrain device 71, the steering device 72, the braking system 73, and the like. For example, when controlling the powertrain device 71, the output unit 48 of the motion manager 45 outputs the instruction value of the motion request to the powertrain control unit 23. Then, the powertrain control unit 23 outputs the control signal to the powertrain device 71 based on the instruction value of the motion request. In this way, the instruction value output by the output unit 48 is received by the control unit corresponding to the actuator to be controlled, and the actuator is controlled by the control unit. Here, when the output unit 48 selects the stop holding request RS as an arbitration result, the output unit 48 first outputs an instruction value for turning ON the hydraulic brake 73A to the hydraulic brake 73A via the brake control unit 43.

Brake Switching Control

Next, with reference to FIG. 3, brake switching control executed by the output unit 48 of the motion manager 45 will be described. The output unit 48 repeatedly executes the brake switching control on a condition that the reception unit 46 receives the stop holding request RS.

As shown in FIG. 3, after starting the brake switching control, the output unit 48 of the motion manager 45 executes the process of step S11. In step S11, the output unit 48 determines whether a predetermined precondition is satisfied. Here, an example of the precondition is a condition that the hydraulic brake 73A is in the ON state and the parking brake 73B is in the OFF state. In step S11, when the output unit 48 determines that the precondition is not satisfied (S11: NO), the output unit 48 finishes the current brake switching control. Then, the output unit 48 advances the process to step S11 again. In contrast, in step S11, when the output unit 48 determines that the precondition is satisfied (S11: YES), the output unit 48 advances the process to step S12.

In step S12, the output unit 48 determines whether a predetermined stop continuation condition is satisfied as a condition for allowing the vehicle 100 to continue in the stopped state. Here, an example of the stop continuation condition is that the road surface slope AR is less than a predetermined prescript slope. Therefore, for example, when the vehicle 100 is located on a horizontal road surface or when the vehicle 100 is located on a gently sloped road surface, the stop continuation condition is satisfied. In step S12, when the output unit 48 determines that the stop continuation condition is satisfied (S12: YES), the output unit 48 advances the process to step S13. In other words, the output unit 48 advances the process to step S13 on a condition that the reception unit 46 has received the stop holding request RS and that the stop continuation condition is satisfied.

In step S13, the output unit 48 determines whether a predetermined switching condition is satisfied as the condition for allowing switching of the parking brake 73B from the OFF state to the ON state. In the present embodiment, the switching condition is that a driver of the vehicle 100 has tried to get off the vehicle 100. For example, the output unit 48 determines that the driver of the vehicle 100 has tried to get off the vehicle 100, when the wearing signal SW corresponding to a driver's seat of the vehicle 100 changes from the ON signal to the OFF signal. In step S13, when the output unit 48 determines that the switching condition is not satisfied (S13: NO), the output unit 48 finishes the current brake switching control. Then, the output unit 48 advances the process to step S11 again.

The process of step S13 is executed when the precondition is satisfied in step S11. Therefore, the hydraulic brake 73A is in the ON state at a time of executing the process of step S13. Then, when it is determined that the precondition is not satisfied in step S13, the output unit 48 continues outputting the instruction value for turning ON the hydraulic brake 73A to the hydraulic brake 73A via the brake control unit 43. In other words, the output unit 48 continues outputting the instruction value for turning ON the hydraulic brake 73A to the hydraulic brake 73A without outputting the instruction value for turning ON the parking brake 73B to the parking brake 73B on the condition that the reception unit 46 has received the stop holding request RS and that the switching condition is not satisfied.

In contrast, in step S13, when the output unit 48 determines that the switching condition is satisfied (S13: YES), the output unit 48 advances the process to step S21. In other words, the output unit 48 advances the process to step S21 on a condition that the reception unit 46 has received the stop holding request RS and that the switching condition is satisfied.

In step S21, the output unit 48 outputs the instruction value for turning ON the parking brake 73B to the parking brake 73B via the brake control unit 43. Here, the output unit 48 continues outputting the instruction value for turning ON the parking brake 73B regardless of a presence or absence of the stop holding request RS, from a processing time of step S21 to the processing time of step S23 which will be described later. After step S21, the output unit 48 advances the process to step S22.

In step S22, the output unit 48 determines whether the switching of the parking brake 73B from the OFF state to the ON state has been completed. For example, the output unit 48 determines, based on a state signal that is a signal indicating the state of the parking brake 73B output from the parking brake 73B, whether the switching of the parking brake 73B from the OFF state to the ON state has been completed. Here, the state signal includes a signal indicating that the parking brake 73B is in the ON state, a signal indicating that the parking brake 73B is in the OFF state, and a signal indicating that the state of the parking brake 73B is in transition. Therefore, when the output unit 48 receives a signal indicating that the parking brake 73B is in the ON state as a state signal, the output unit 48 determines that the switching of the parking brake 73B from the OFF state to the ON state has been completed. In step S22, when the output unit 48 determines that the switching of the parking brake 73B from the OFF state to the ON state has not been completed (S22: NO), the output unit 48 advances the process to step S22 again. In contrast, in step S22, when the output unit 48 determines that the switching of the parking brake 73B from the OFF state to the ON state has been completed (S22: YES), the output unit 48 advances the process to step S23.

In step S23, the output unit 48 finishes outputting the instruction value for turning ON the parking brake 73B. Therefore, when outputting the instruction value for turning ON the parking brake 73B to the parking brake 73B, the output unit 48 continues outputting the instruction value to the parking brake 73B regardless of the presence or absence of the stop holding request RS, after starting outputting the instruction value and until the switching of the parking brake 73B to the ON state has been completed. After step S23, the output unit 48 advances the process to step S24.

In step S24, the output unit 48 outputs the instruction value for turning OFF the hydraulic brake 73A to the hydraulic brake 73A via the brake control unit 43. After step S24, the output unit 48 finishes the current brake switching control.

In contrast, in step S12 described above, when the output unit 48 determines that the stop continuation condition is not satisfied (S12: NO), the output unit 48 advances the process to step S31. In other words, the output unit 48 advances the process to step S31 on a condition that the reception unit 46 has received the stop holding request RS and that the stop continuation condition is not satisfied.

In step S31, the output unit 48 outputs the instruction value for turning OFF the hydraulic brake 73A to the hydraulic brake 73A via the brake control unit 43. In other words, the output unit 48 outputs the instruction value for turning OFF the hydraulic brake 73A to the hydraulic brake 73A without outputting the instruction value for turning ON the parking brake 73B to the parking brake 73B. After step S31, the output unit 48 finishes the current brake switching control.

Actions of Present Embodiments

For example, assume that the reception unit 46 has received the stop holding request RS from the first assistance unit 56, thereby selecting the stop holding request RS as the arbitration result. In this case, the output unit 48 first outputs the instruction value for turning ON the hydraulic brake 73A to the hydraulic brake 73A via the brake control unit 43. Then, the vehicle 100 is kept in the stopped state by the hydraulic brake 73A. Further, as shown in FIG. 3, in the vehicle 100, the brake switching control is executed on the condition that the reception unit 46 has received the stop holding request RS. Then, it is assumed that all of the precondition in step S11, the stop continuation condition in step S12, and the switching condition in step S13 are satisfied. In this case, in step S21, the output unit 48 outputs the instruction value for turning ON the parking brake 73B to the parking brake 73B via the brake control unit 43. Here, it takes a certain amount of time until the switching of the parking brake 73B from the OFF state to the ON state has been completed. Assume that the stop holding request RS is interrupted before the parking brake 73B is turned ON. At this time, when the output of the instruction value to the parking brake 73B is lost due to the interruption of the stop holding request RS, the parking brake 73B stops operating. In other words, the parking brake 73B that should be in the ON state remains in the OFF state. In this regard, the output unit 48 continues outputting the instruction value to the parking brake 73B regardless of the presence or absence of the stop holding request RS, after outputting the instruction value for turning ON the parking brake 73B and until the switching of the parking brake 73B to the ON state has been completed.

Effects of Present Embodiment

According to the present embodiment, even when the stop holding request RS is no longer present before the switching of the parking brake 73B from the OFF state to the ON state has been completed, the output unit 48 continues outputting the instruction value for turning ON the parking brake 73B. Thereby, even when the stop holding request RS is no longer present before the switching of the parking brake 73B from the OFF state to the ON state has been completed, the stopped state of the vehicle 100 can be kept by turning ON the parking brake 73B.

According to the present embodiment, the output unit 48 continues outputting the instruction value for turning ON the hydraulic brake 73A to the hydraulic brake 73A without outputting the instruction value for turning ON the parking brake 73B to the parking brake 73B on the condition that the reception unit 46 receives the stop holding request RS and that the switching condition is not satisfied. In contrast, the output unit 48 outputs the instruction value for turning ON the parking brake 73B to the parking brake 73B on the condition that the reception unit 46 receives the stop holding request RS and that the switching condition is satisfied. As a result, compared to a configuration in which, for example, the output unit 48 outputs the instruction value for turning ON the parking brake 73B only on the condition that the reception unit 46 receives the stop holding request RS, unnecessarily turning ON the parking brake 73B can be suppressed.

In the present embodiment, the switching condition is that a driver of the vehicle 100 has tried to get off the vehicle. Thereby, the parking brake 73B can be turned ON in a situation where it is highly necessary to turning ON the parking brake 73B, such as when the driver of the vehicle 100 has tried to get off the vehicle 100.

According to the present embodiment, the output unit 48 outputs the instruction value for turning ON the parking brake 73B to the parking brake 73B on the condition that the reception unit 46 receives the stop holding request RS and that the stop continuation condition is satisfied. In contrast, the output unit 48 outputs the instruction value for turning OFF the hydraulic brake 73A to the hydraulic brake 73A without the output unit 48 outputting the instruction value for turning ON the parking brake 73B to the parking brake 73B on the condition that the reception unit 46 receives the stop holding request RS and that the stop continuation condition is not satisfied. In other words, in a situation where the continuation of the stopped state of the vehicle 100 due to the request from the application software should be prohibited, the vehicle 100 becomes movable by turning OFF the hydraulic brake 73A and the parking brake 73B. In a state in which the vehicle 100 is movable, for example, when the vehicle 100 moves, the driver of the vehicle 100 can understand that the continuation of the stopped state of the vehicle 100 due to the request from the application software should be prohibited. Then, the driver of the vehicle 100 can be prompted to operate the vehicle 100.

Generally, in a situation where the vehicle 100 is located on a steeply sloped road surface, the vehicle 100 is likely to move when the vehicle 100 becomes movable. In this regard, in the present embodiment, the stop continuation condition is that the road surface slope AR is less than the predetermined prescript slope. Therefore, in a situation where the driver of the vehicle 100 can easily recognize a movement of the vehicle 100 such as when the road surface slope AR is equal to or higher than the predetermined prescript slope, the driver of the vehicle 100 can be prompted to operate the vehicle 100.

Modifications

The present embodiment can be realized with the following modifications. The present embodiment and the following modifications can be combined with each other within a technically consistent range to be realized.

In the above embodiment, the brake switching control may be changed. For example, the stop continuation condition in step S12 may be changed. As a specific example, the stop continuation condition may include another requirement in addition to or instead of the road surface slope AR being less than the predetermined prescript slope.

For example, the process in step S12 may be omitted. As a specific example, when the output unit 48 makes an affirmative determination in step S11, the output unit 48 may advance the process to step S13. In this case, the process in step S31 may also be omitted.

For example, the switching condition in step S13 may be changed. As a specific example, the output unit 48 may determine that the driver of the vehicle 100 has tried to get off the vehicle 100, when the door corresponding to the driver's seat of the vehicle 100 changes from a closed state to an open state. Further, as a specific example, the switching condition may include another requirement in addition to or instead of the condition that the driver of the vehicle 100 has tried to get off the vehicle.

For example, the process in step S13 may be omitted. As a specific example, when the output unit 48 makes an affirmative determination in step S12, the output unit 48 may advance the process to step S21. That is, when the parking brake 73B is in a situation to be switched from the OFF state to the ON state, the present technology can be applied in which the output unit 48 continues outputting the instruction value for turning ON the parking brake 73B regardless of the presence or absence of the stop holding request RS.

For example, the process in step S31 may be changed. As a specific example, in addition to or instead of the output unit 48 outputting the instruction value for turning OFF the hydraulic brake 73A, the output unit 48 may notify the driver and the like that the continuation of the stopped state of the vehicle 100 due to the request from the application software should be prohibited. Note that as a configuration for notifying the driver of the vehicle 100, for example, a configuration for notifying the driver using a display, a speaker, and the like can be adopted.

In the above embodiment, the configuration of the vehicle 100 may be changed. For example, the ECU that realizes the function of the motion manager 45 may be an ECU other than the brake ECU 40. As a specific example, instead of the brake ECU 40, the CPU 11 of the central ECU 10 may realize the function of the motion manager 45 by executing the motion manager application 45A stored in the storage device 12. That is, the central ECU 10, the powertrain ECU 20, the steering ECU 30, the brake ECU 40, and the advanced driving assistance ECU 50 can realize the function of the motion manager 45.

What is claimed is:

1. A motion manager comprising one or more processors configured to:
   receive a stop holding request for keeping a vehicle in a stopped state as one of motion requests from application software;
   output an instruction value for turning ON a hydraulic brake to the hydraulic brake on a condition that the stop holding request is received; and
   continue outputting the instruction value to a parking brake regardless of a presence or absence of the stop holding request, when outputting an instruction value for turning ON the parking brake to the parking brake after starting outputting the instruction value and until switching of the parking brake to an ON state is completed.

2. The motion manager according to claim 1, wherein the one or more processors are configured to:
   output the instruction value for turning ON the parking brake to the parking brake on a condition that the stop holding request is received and that a predetermined stop continuation condition serving as a condition for allowing continuation of the stopped state is satisfied; and
   output an instruction value for turning OFF the hydraulic brake to the hydraulic brake without outputting the instruction value for turning ON the parking brake to the parking brake on the condition that the stop holding request is received and that the stop continuation condition is not satisfied.

3. The motion manager according to claim 2, wherein the stop continuation condition includes that a slope of a road surface on which the vehicle is located is less than a predetermined prescript slope.

4. The motion manager according to claim 1, wherein the one or more processors are configured to:
- output the instruction value for turning ON the parking brake to the parking brake on a condition that the stop holding request is received and that a predetermined switching condition serving as a condition for allowing the switching of the parking brake to the ON state is satisfied; and
- continue outputting an instruction value for turning ON the hydraulic brake to the hydraulic brake without outputting the instruction value for turning ON the parking brake to the parking brake on the condition that the stop holding request is received and that the switching condition is not satisfied.

5. The motion manager according to claim 4, wherein the switching condition includes that a driver of the vehicle tries to get off the vehicle.

6. An information processing method comprising:
- receiving, by an information processing device, a stop holding request for keeping a vehicle in a stopped state as one of motion requests from application software;
- outputting, by the information processing device, an instruction value for turning ON a hydraulic brake to the hydraulic brake on a condition that the stop holding request is received; and
- continuing, by the information processing device, outputting the instruction value to a parking brake regardless of a presence or absence of the stop holding request, when outputting an instruction value for turning ON the parking brake to the parking brake after starting outputting the instruction value and until switching of the parking brake to an ON state is completed.

* * * * *